US012380868B2

(12) United States Patent
Liu

(10) Patent No.: US 12,380,868 B2
(45) Date of Patent: Aug. 5, 2025

(54) VOLTAGE CONTROL CIRCUIT INCLUDING A TIMING CONTROL MODULE CONTROLLING WHETHER A SECOND VOLTAGE SIGNAL IS OUTPUTTED, AND DISPLAY PANEL

(71) Applicant: Shenzhen China Star Optoelectronics Semiconductor Display Technology Co., Ltd., Shenzhen (CN)

(72) Inventor: Fangyun Liu, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/620,105

(22) PCT Filed: Nov. 29, 2021

(86) PCT No.: PCT/CN2021/134131
§ 371 (c)(1),
(2) Date: Jul. 23, 2024

(87) PCT Pub. No.: WO2023/087381
PCT Pub. Date: May 25, 2023

(65) Prior Publication Data

US 2024/0386865 A1 Nov. 21, 2024

(30) Foreign Application Priority Data

Nov. 18, 2021 (CN) .......................... 202111371100.1

(51) Int. Cl.
*G09G 3/36* (2006.01)

(52) U.S. Cl.
CPC .................................. *G09G 3/3696* (2013.01)

(58) Field of Classification Search
None
See application file for complete search history.

(56) References Cited

U.S. PATENT DOCUMENTS

2020/0013324 A1* 1/2020 Zhan .................... G09G 3/3655
2020/0183210 A1* 6/2020 Zhang ................. G02F 1/13306

FOREIGN PATENT DOCUMENTS

| | | | | | |
|---|---|---|---|---|---|
| CN | 107342063 | A | | 11/2017 | |
| CN | 108198531 | A | | 6/2018 | |
| CN | 207663771 | U | * | 7/2018 | |
| CN | 108469869 | A | | 8/2018 | |
| CN | 108648717 | A | * | 10/2018 | ........... G09G 3/3696 |
| CN | 214174767 | U | | 9/2021 | |
| JP | 2020517991 | A | | 6/2020 | |
| JP | 2020526799 | A | | 8/2020 | |
| KR | 20020091689 | A | | 12/2002 | |

* cited by examiner

*Primary Examiner* — Kirk W Hermann
(74) *Attorney, Agent, or Firm* — PV IP PC; Wei Te Chung

(57) ABSTRACT

A voltage control circuit comprises a timing control module; the timing control module comprises a first comparator, a second comparator, and an AND gate comparator, two input ends of the AND gate comparator are respectively connected to the output end of the first comparator and the output end of the second comparator, and the output end of the AND gate comparator is used for controlling the output of a second voltage signal; and the timing control module can implement control on the timing of the second voltage signal.

20 Claims, 1 Drawing Sheet

VOLTAGE CONTROL CIRCUIT INCLUDING A TIMING CONTROL MODULE CONTROLLING WHETHER A SECOND VOLTAGE SIGNAL IS OUTPUTTED, AND DISPLAY PANEL

CROSS REFERENCE TO RELATED APPLICATIONS

This application is a national phase application under 35 U. § 371 of PCT Application No. PCT/CN2021/134131 filed Nov. 29, 2021, which claims priority to Chinese Application No. 202111371100.1 filed Nov. 18, 2021, the contents of which are incorporated herein by reference in their entirety.

FIELD OF INVENTION

The present disclosure relates to the field of liquid crystal display (LCD) technologies, and specifically, to a voltage control circuit and a display panel.

BACKGROUND OF INVENTION

DVR IC is an adjustable output voltage chip, which is often used to generate a VCOM voltage in liquid crystal display (LCD) driving. The DVR IC includes a voltage control circuit for controlling the output of VCOM. However, in terms of timing, the conventional voltage control circuits cannot achieve the consistency of VCOM and GAMMA in timing. The voltage across two ends of the liquid crystal is equal to the difference between the VCOM voltage and the GAMMA voltage. The VCOM voltage is the voltage of the common electrode of the LCD. If VCOM is not consistent with GAMMA in timing, the voltage of the liquid crystal may shift, leading to image abnormality.

SUMMARY OF THE INVENTION

Technical Problem

Therefore, the conventional voltage control circuits have the technical problem that the timing of the output voltage is uncontrollable.

Solutions to Technical Problems

Technical Solution

Embodiments of the present disclosure provide a voltage control circuit and a display panel, which can alleviate the technical problem in the conventional voltage control circuits that image abnormality occurs due to inconsistency of VCOM and GAMMA in timing.

The embodiments of the present disclosure provide a voltage control circuit, including:

- an I2C control module, configured to convert a first input signal and a second input signal into a code signal;
- a digital-to-analog conversion module, configured to receive the code signal and convert the code signal into a first voltage signal;
- an amplification module, configured to amplify the first voltage signal into a second voltage signal; and
- a timing control module, including a first comparator, a second comparator, and an AND gate comparator, an output end of the first comparator and an output end of the second comparator being respectively connected to two input ends of the AND gate comparator, and an output end of the AND gate comparator being connected to the amplification module, wherein
- the timing control module is configured to control output of the second voltage signal, when the output end of the AND gate comparator is 1, the second voltage signal is outputted, and when the output end of the AND gate comparator is 0, the second voltage signal stops being outputted.

Optionally, in some embodiments of the present disclosure, two input ends of the first comparator are further respectively connected to a first power supply voltage and a first under-voltage protection voltage, wherein a positive electrode of the first comparator is connected to the first power supply voltage, and a negative electrode of the first comparator is connected to the first under-voltage protection voltage.

Optionally, in some embodiments of the present disclosure, two input ends of the second comparator are further respectively connected to a second power supply voltage and a second under-voltage protection voltage, wherein a positive electrode of the second comparator is connected to the second power supply voltage, and a negative electrode of the second comparator is connected to the second under-voltage protection voltage.

Optionally, in some embodiments of the present disclosure, the first power supply voltage is VDD33, and the second power supply voltage is AVDD.

Optionally, in some embodiments of the present disclosure, the VDD33 is separately applied to the I2C control module and the timing control module, and the AVDD is separately applied to the amplification module and the digital-to-analog conversion module.

Optionally, in some embodiments of the present disclosure, the second voltage signal is a VCOM signal, and the third voltage signal is a GAMMA signal.

Optionally, in some embodiments of the present disclosure, the VDD33 is fed first and starts to be increased, and when the VDD33 is greater than the first under-voltage protection voltage, a level of the output end of the first comparator is 1.

Optionally, in some embodiments of the present disclosure, after the level of the output end of the first comparator reaches 1, the AVDD starts to be increased; and when the AVDD is equal to the second under-voltage protection voltage, the level of the output end of the first comparator is 1, a level of the output end of the second comparator is 0, a level of the output end of the AND gate comparator is 0, and the second voltage signal stops being outputted.

Optionally, in some embodiments of the present disclosure, the AVDD continues to be increased; and when the AVDD is greater than the second under-voltage protection voltage, the level of the output end of the second comparator is 1, the level of the output end of the AND gate comparator is 1, and the second voltage signal is outputted.

Optionally, in some embodiments of the present disclosure, when a condition that the AVDD is greater than the second under-voltage protection voltage is satisfied, the third voltage signal also starts being outputted, so that the second voltage signal and the third voltage signal start being outputted in the same timing.

Optionally, in some embodiments of the present disclosure, when the AVDD is greater than the second under-voltage protection voltage, both the second voltage signal and the third voltage signal are continuously outputted.

Optionally, in some embodiments of the present disclosure, the AVDD continues to be decreased, the AVDD is less than or equal to the second under-voltage protection voltage, a level of the output end of the AND gate comparator is 0, and the second voltage signal stops being outputted.

Optionally, in some embodiments of the present disclosure, when the AVDD is equal to the second under-voltage protection voltage, a level of the output end of the second comparator is 0.

Optionally, in some embodiments of the present disclosure, when the AVDD is equal to the second under-voltage protection voltage, the third voltage signal stops being outputted, and the second voltage signal and the third voltage signal stop being outputted in the same timing.

Optionally, in some embodiments of the present disclosure, the digital-to-analog conversion module further includes a digital-to-analog conversion interface and a voltage control interface, where the digital-to-analog conversion interface is configured to convert the code signal into a transition signal, and the voltage control interface is configured to convert the transition signal into the first voltage signal and output the first voltage signal.

Optionally, in some embodiments of the present disclosure, the amplification module further includes a third comparator. When a level of an output end of the third comparator is 1, the second voltage signal is outputted; and when the level of the output end of the third comparator is 0, the second voltage signal stops being outputted.

Optionally, in some embodiments of the present disclosure, the I2C control module includes an I2C communication interface. The first input signal and the second input signal are respectively applied to two input ends of the I2C communication interface, and an output end of the I2C communication interface is connected to an input end of the digital-to-analog conversion interface.

Optionally, in some embodiments of the present disclosure, the first input signal is SCL, and the second input signal is SDA.

Optionally, in some embodiments of the present disclosure, the I2C control module further includes a first capacitor, and the first capacitor is connected to the positive electrode of the input ends of the first comparator. The digital-to-analog conversion module further includes a second capacitor, and the second capacitor is connected to the positive electrode of the input ends of the second comparator. The first capacitor is configured to stabilize the VDD33, and the second capacitor is configured to stabilize the AVDD.

The embodiments of the present disclosure provide a display panel. The display panel includes the voltage control circuit in any one of the above embodiments.

BENEFICIAL EFFECTS OF THE PRESENT DISCLOSURE

Beneficial Effects

The voltage control circuit provided in the embodiments of the present disclosure includes an I2C control module, a digital-to-analog conversion module, an amplification module, and a timing control module. The timing control module includes a first comparator, a second comparator, and an AND gate comparator. The timing control module is configured to control output of a second voltage signal. When an output end of the AND gate comparator is 1, the second voltage signal is outputted, and when an output end of the AND gate comparator is 0, the second voltage signal stops being outputted. When output ends of the first comparator and the second comparator are both 1, the output end of the AND gate comparator is 1, thereby outputting the second voltage signal. The timing control module can control a timing of the second voltage signal according to a level of the output end of the first comparator and a level of the output end of the second comparator, thereby alleviating the technical problem in the conventional voltage control circuits that a timing of an output voltage is uncontrollable.

BRIEF DESCRIPTION OF DRAWINGS

Description of Drawings

To describe the technical solutions in the embodiments of the present disclosure more clearly, the following briefly describes accompanying drawings required for describing the embodiments. Apparently, the accompanying drawings in the following description show merely some embodiments of the present disclosure, and a person skilled in the art may still derive other drawings from these accompanying drawings without creative efforts.

Figure 1:
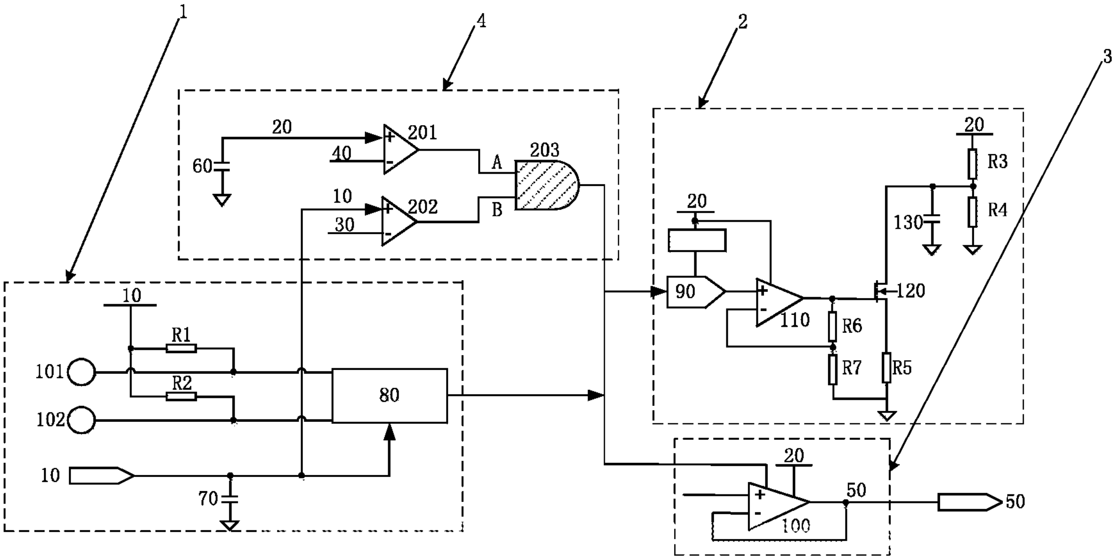

FIG. 1 is a schematic diagram of a voltage control circuit according to the present disclosure.

Figure 2:
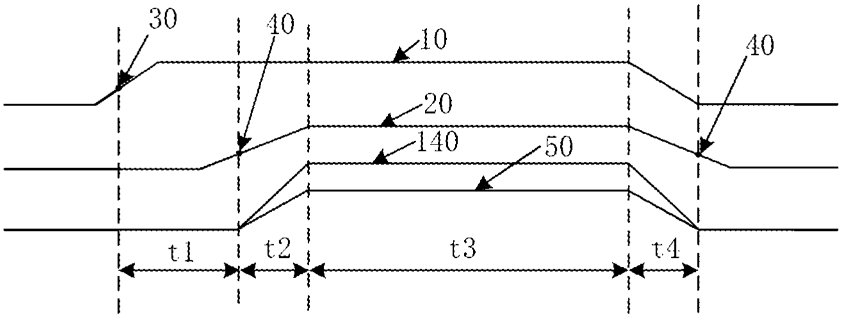

FIG. 2 is a timing diagram of a voltage control circuit according to the present disclosure.

DETAILED DESCRIPTION OF PREFERRED EMBODIMENTS

Embodiments of the Present Disclosure

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without creative efforts shall fall within the protection scope of the present disclosure. In addition, it should be understood that the specific implementations described herein are merely used for describing and illustrating the present disclosure rather than limiting the present disclosure. In the present disclosure, without the contrary explanation, the directional terms, such as "upper" and lower" are usually refer to the upper and lower directions of an apparatus in actual use or working state, and specifically refer to the drawing directions in the accompanying drawings, and "inside and outside" are in terms of an outline of the apparatus.

The conventional voltage control circuit includes merely an I2C control module, a digital-to-analog conversion module, and an amplification module. The I2C control module is configured to convert a first input signal 101 and a second input signal 102 into a code signal, the digital-to-analog conversion module is configured to receive the code signal and convert the code signal into a first voltage signal, and the amplification module is configured to amplify the first voltage signal into a second voltage signal. However, the conventional voltage control circuit cannot control a timing of the second voltage signal. Therefore, when the conventional voltage control circuit is applied to various panels or terminals, image abnormality caused by uncontrollable timing is prone to occur.

Referring to FIG. 1, the present disclosure provides a voltage control circuit, which alleviates the technical problem in the conventional voltage control circuits that a timing of an output voltage is uncontrollable. The voltage control circuit includes an I2C control module 1, a digital-to-analog conversion module 2, an amplification module 3, and a timing control module 4. The I2C control module 1 is configured to convert a first input signal 101 and a second input signal 102 into a code signal, the digital-to-analog conversion module 2 is configured to receive the code signal and convert the code signal into a first voltage signal, and the amplification module 3 is configured to amplify the first voltage signal into a second voltage signal 50. The timing control module 4 includes a first comparator 201, a second comparator 202, and an AND gate comparator 203. An output end of the first comparator 201 and an output end of the second comparator 202 are respectively connected to two input ends of the AND gate comparator 203, and an output end of the AND gate comparator 203 is connected to the amplification module 3. The timing control module 4 is configured to control output of the second voltage signal 50, when the output end of the AND gate comparator 203 is 1, the second voltage signal 50 is outputted, and when the output end of the AND gate comparator 203 is 0, the second voltage signal 50 stops being outputted.

In the present embodiment, a timing control module 4 is disposed in the voltage control circuit to control the timing of the second voltage signal 50, thereby alleviating the technical problem in the conventional voltage control circuits that a timing of an output voltage is uncontrollable.

The output voltage of the voltage control circuit is the second voltage signal 50 amplified using an amplified signal.

The first comparator 201 includes two input ends and one output end, and the two input ends include a positive electrode and a negative electrode. When a voltage applied to the positive electrode of the first comparator 201 is greater than a voltage applied to the negative electrode of the first comparator 201, the output end of the first comparator 201 is 1. On the contrary, when a voltage applied to the positive electrode of the first comparator 201 is less than or equal to a voltage applied to the negative electrode of the first comparator 201, the output end of the first comparator 201 is 0.

The second comparator 202 also includes two input ends and one output end, and the two input ends include a positive electrode and a negative electrode. When a voltage applied to the positive electrode of the second comparator 202 is greater than a voltage applied to the negative electrode of the second comparator 202, the output end of the second comparator 202 is 1. On the contrary, when a voltage applied to the positive electrode of the second comparator 202 is less than or equal to a voltage applied to the negative electrode of the second comparator 202, the output end of the second comparator 202 is 0.

The AND gate comparator 203 includes two input ends and one output end. One of the input ends is connected to the output end of the first comparator 201, and the other input end is connected to the output end of the second comparator 202. When a level B of the output end of the first comparator 201 is 1 and a level A of the output end of the second comparator 202 is 1, the output end of the AND gate comparator 203 is 1. In this case, the second voltage signal 50 is outputted. On the contrary, when the level B of the output end of the first comparator 201 is 0 and/or the level A of the output end of the second comparator 202 is 0, the second voltage signal 50 stops being outputted, thereby realizing the control of the timing of the second voltage signal 50.

The technical solutions in the present disclosure are described with reference to specific embodiments. An example in which the second voltage signal 50 is a VCOM signal is used for description in the following embodiments and is only described as an application scenario, and the protection scope of the present disclosure is not limited thereto. In a liquid crystal display (LCD) panel, a voltage signal of a common electrode is the VCOM signal, and a voltage signal of an other electrode is a GAMMA signal. A voltage across two ends of the liquid crystal is equal to a difference between a VCOM voltage and a GAMMA voltage. Therefore, the VCOM signal needs to be consistent with the GAMMA signal in timing. The third voltage signal 140 described below is the GAMMA signal.

It should be noted that, in the following embodiments, a first power supply voltage 10 is VDD33, and a second power supply voltage 20 is AVDD, wherein the VDD33 is a VDD voltage of 3.3 v, and the AVDD is used for controlling consistency of the VCOM and the GAMMA in timing.

Referring to FIG. 1, the voltage control circuit provided in the present disclosure is configured to output the second voltage signal 50 with a controllable timing, and the second voltage signal 50 is the VCOM signal.

In an embodiment, the two input ends of the first comparator 201 are further respectively connected to the first power supply voltage 10 and a first under-voltage protection voltage 30, wherein the positive electrode of the first comparator 201 is connected to the first power supply voltage 10, and the negative electrode of the first comparator 201 is connected to the first under-voltage protection voltage 30.

When the first power supply voltage 10 is greater than the first under-voltage protection voltage 30, the level B of the output end of the first comparator 201 is 1.

When the first power supply voltage 10 is less than or equal to the first under-voltage protection voltage 30, the level B of the output end of the first comparator 201 is 0.

In an embodiment, the two input ends of the second comparator 202 are further respectively connected to the second power supply voltage 20 and a second under-voltage protection voltage 40, wherein the positive electrode of the second comparator 202 is connected to the second power supply voltage 20, and the negative electrode of the second comparator 202 is connected to the second under-voltage protection voltage 40.

When the second power supply voltage 20 is greater than the second under-voltage protection voltage 40, the level A of the output end of the second comparator 202 is 1.

When the second power supply voltage 20 is less than or equal to the second under-voltage protection voltage 40, the level A of the output end of the second comparator 202 is 0.

In an embodiment, the VDD33 is separately applied to the I2C control module 1 and the timing control module 4, and the AVDD is separately applied to the amplification module 3, the digital-to-analog conversion module 2, and the timing control module 4.

In an embodiment, during startup, the VDD33 is fed first and starts to be increased, and when the VDD33 is greater than the first under-voltage protection voltage 30, the level of the output end of the first comparator 201 is 1.

Referring to FIG. 2, in an embodiment, after the level B of the output end of the first comparator 201 reaches 1, the AVDD starts to be increased. After a first period of time t1, when the AVDD is equal to the second under-voltage protection voltage 40, the level B of the output end of the first comparator 201 is 1, the level A of the output end of the second comparator 202 is 0, the level of the output end of the AND gate comparator 203 is 0, and the second voltage signal 50 stops being outputted.

During rising of the AVDD, when the AVDD is equal to the second under-voltage protection voltage 40, it is a critical point at which the level A of the output end of the second comparator 202 changes from 0 to 1. In this case, in the next instant, when the AVDD is greater than the second under-voltage protection voltage 40, the level A of the output end of the second comparator 202 is 1.

In an embodiment, the AVDD continues to be increased; and when the AVDD is greater than the second under-voltage protection voltage 40, the level A of the output end of the second comparator 202 is 1, the level of the output end of the AND gate comparator 203 is 1, and the second voltage signal 50 is outputted.

It may be understood that when the level B of the output end of the first comparator 201 and the level A of the output end of the second comparator 202 are both 1, the level of the output end of the AND gate comparator 203 is also 1. In this case, the VCOM signal starts being outputted, and meanwhile, in another drive circuit connected to a data line, the GAMMA signal also starts being outputted.

It should be noted that in the another drive circuit, the drive circuit outputs the GAMMA signal. When the second power supply voltage 20, that is, the AVDD is greater than the second under-voltage protection voltage 40, the drive circuit also starts to output the GAMMA signal. Therefore, during startup, consistency of the VCOM signal and the GAMMA signal in timing is realized in the voltage control circuit.

In an embodiment, when a condition that the AVDD is greater than the second under-voltage protection voltage 40 is satisfied, the third voltage signal 140 also starts being outputted, so that the second voltage signal 50 and the third voltage signal 140 start being outputted in the same timing.

The third voltage signal 140 is the GAMMA signal.

In an embodiment, when the AVDD is greater than the second under-voltage protection voltage 40, both the second voltage signal 50 and the third voltage signal 140 are continuously outputted.

In the present embodiment, referring to FIG. 2, when the AVDD is greater than the second under-voltage protection voltage 40, both the second voltage signal 50 and the third voltage signal 140 are continuously outputted, but are outputted in three periods of time.

Referring to FIG. 2, the three periods of time include a second period of time t2, a third period of time t3, and a fourth period of time t4.

The second period of time t2 is a rising phase of the AVDD, the VCOM, and the GAMMA. After the AVDD is equal to the second under-voltage protection voltage 40, and after the second period of time t2, the AVDD, the VCOM, and the GAMMA all reach states of maximum output voltages. The states of the maximum output voltages are states when the AVDD, the VCOM, and the GAMMA are at maximum voltages that can be reached respectively.

The third period of time t3 is a voltage stabilizing stage of the AVDD, the VCOM, and the GAMMA. In the third period of time t3, the maximum output voltages of the AVDD, the VCOM, and the GAMMA remain unchanged.

The fourth period of time t4 is a falling phase of the AVDD, the VCOM, and the GAMMA. In the fourth period of time t4, the AVDD, the VCOM, and the GAMMA all start to be decreased continuously. When the AVDD is less than or equal to the second under-voltage protection voltage 40, the VCOM and the GAMMA are 0, and the VCOM signal and the GAMMA signal stop being outputted.

In an embodiment, the voltage control circuit further includes a fourth comparator 110. The fourth comparator 110 is disposed in the digital-to-analog conversion module 2, and a positive electrode of input ends of the fourth comparator 110 is connected to an output end of a digital-to-analog conversion interface 90.

In an embodiment, the digital-to-analog conversion module 2 further includes a sliding rheostat interface 120. The sliding rheostat interface 120 changes the first voltage signal using a change in resistance, thereby changing the magnitude of a first voltage. The magnitude of a second voltage is controlled by the voltage control circuit through the sliding rheostat interface 120.

The second voltage is VCOM, the second voltage signal 50 is a VCOM signal, and the third voltage signal 140 is a GAMMA signal.

In an embodiment, the digital-to-analog conversion module 2 further includes a third capacitor 130. The third capacitor 130 has a voltage stabilizing effect on the digital-to-analog conversion module 2. One end of the third capacitor 130 is connected to one end of the sliding rheostat interface 120.

In an embodiment, referring to FIG. 1, the voltage control circuit includes the I2C control module 1, the digital-to-analog conversion module 2, and the amplification module 3.

The I2C control module 1 further includes a first resistor R1 and a second resistor R2. The first power supply voltage 10 is applied to one end of the first resistor R1, and a first input signal 101 is applied to the other end of the first resistor R1. The first power supply voltage 10 is applied to one end of the second resistor R2, and a second input signal 102 is applied to the other end of the second resistor R2.

The digital-to-analog conversion interface 90 includes a third resistor R3, a fourth resistor R4, a fifth resistor R5, a sixth resistor R6, and a seventh resistor R7. For a specific connection manner, reference may be made to FIG. 1. This is not further limited herein.

It should be noted that, the improvement provided in the present disclosure mainly lies in the timing control of the second voltage signal 50 by the timing control module 4. Therefore, the I2C control module 1, the digital-to-analog conversion module 2, and the amplification module 3 of the voltage control circuit are not limited to the connection manner shown in FIG. 1. Other module structures that can achieve the same effect should be further included, and FIG. 1 is only an illustration of an implementation.

In an embodiment, during shutdown, the AVDD continues to be decreased, the AVDD is less than or equal to the second under-voltage protection voltage 40, the level of the output end of the AND gate comparator 203 is 0, and the second voltage signal 50 stops being outputted.

In an embodiment, when the AVDD is equal to the second under-voltage protection voltage 40, the level A of the output end of the second comparator 202 is 0.

In an embodiment, when the AVDD is equal to the second under-voltage protection voltage 40, the third voltage signal 140 stops being outputted, so that the second voltage signal 50 and the third voltage signal 140 stop being outputted in the same timing.

In an embodiment, the digital-to-analog conversion module 2 further includes a digital-to-analog conversion interface 90 and a voltage control interface. The digital-to-analog conversion interface 90 is configured to convert the code signal into a transition signal, and the voltage control interface is configured to convert the transition signal into the first voltage signal and output the first voltage signal.

In an embodiment, the amplification module 3 further includes a third comparator 100. When a level of an output end of the third comparator 100 is 1, the second voltage signal 50 is outputted. When the level of the output end of the third comparator 100 is 0, the second voltage signal 50 stops being outputted.

In an embodiment, the I2C control module 1 includes an I2C communication interface 80. The first input signal 101 and the second input signal 102 are respectively applied to two input ends of the I2C communication interface 80. An output end of the I2C communication interface 80 is connected to an input end of the digital-to-analog conversion interface 90.

In an embodiment, the first input signal 101 is SCL, and the second input signal 102 is SDA.

In an embodiment, the I2C control module 1 further includes a first capacitor 60. The first capacitor 60 is connected to the positive electrode of the input ends of the first comparator 201. The digital-to-analog conversion module 2 further includes a second capacitor 70. The second capacitor 70 is connected to the positive electrode of the input ends of the second comparator 202. The first capacitor 60 is configured to stabilize the VDD33, and the second capacitor 70 is configured to stabilize the AVDD.

The present disclosure further provides a display panel, a display module, and a display apparatus. The display panel includes the voltage control circuit in any one of the above embodiments. The display module includes the display panel, and a back plate, a plastic frame, an optical film, a light guide plate/diffusion plate, and the like on one side of the display panel. The display apparatus includes the voltage control circuit, the display panel, or the display module, and details are not described herein again.

The voltage control circuit provided in the present embodiments includes an I2C control module, a digital-to-analog conversion module, an amplification module, and a timing control module. The timing control module includes a first comparator, a second comparator, and an AND gate comparator. The timing control module controls output of a second voltage signal. When an output end of the AND gate comparator is 1, the second voltage signal is outputted; and when an output end of the AND gate comparator is 0, the second voltage signal stops being outputted. When output ends of the first comparator and the second comparator are both 1, the output end of the AND gate comparator is 1, thereby outputting the second voltage signal. The timing control module can control the timing of the second voltage signal according to a level of the output end of the first comparator and/or the second comparator being 1 or 0, which alleviates the technical problem in the conventional voltage control circuits that a timing of an output voltage is uncontrollable.

In the above embodiments, description of each embodiment focuses on a different part, and for parts that are not described in detail in one embodiment, reference may be made to the related description of other embodiments.

The voltage control circuit provided in the embodiments of the present disclosure are described in detail above. The principles and implementations of the present disclosure are described through specific examples in this specification, and the descriptions of the embodiments are only intended to help understand the methods and core ideas of the present disclosure. Meanwhile, a person skilled in the art may make modifications to the specific implementations and application scopes according to the ideas of the present disclosure. In conclusion, the content of the specification should not be construed as a limitation to the present disclosure.

What is claimed is:

1. A voltage control circuit, comprising:

an I2C control module, configured to convert a first input signal and a second input signal into a code signal;

a digital-to-analog conversion module, configured to receive the code signal and convert the code signal into a first voltage signal;

an amplification module, configured to amplify the first voltage signal into a second voltage signal; and a timing control module, comprising a first comparator, a second comparator, and an AND gate comparator, an output end of the first comparator and an output end of the second comparator being respectively connected to two input ends of the AND gate comparator, and an output end of the AND gate comparator being connected to the amplification module, wherein the timing control module is configured to control whether the second voltage signal is outputted, when the output end of the AND gate comparator is 1, the second voltage signal is outputted, and when the output end of the AND gate comparator is 0, the second voltage signal stops being outputted.

2. The voltage control circuit as claimed in claim 1, wherein two input ends of the first comparator are further respectively connected to a first power supply voltage and a first under-voltage protection voltage, wherein a positive electrode of the first comparator is connected to the first power supply voltage, and a negative electrode of the first comparator is connected to the first under-voltage protection voltage.

3. The voltage control circuit as claimed in claim 2, wherein two input ends of the second comparator are further respectively connected to a second power supply voltage and a second under-voltage protection voltage, wherein a positive electrode of the second comparator is connected to the second power supply voltage, and a negative electrode of the second comparator is connected to the second under-voltage protection voltage.

4. The voltage control circuit as claimed in claim 3, wherein the first power supply voltage is VDD33, and the second power supply voltage is AVDD.

5. The voltage control circuit as claimed in claim 4, wherein the VDD33 is separately applied to the I2C control module and the timing control module, and the AVDD is separately applied to the amplification module and the digital-to-analog conversion module.

6. The voltage control circuit as claimed in claim 5, wherein the second voltage signal is a VCOM signal, and a third voltage signal is a GAMMA signal.

7. The voltage control circuit as claimed in claim 6, wherein the VDD33 is fed first and starts to be increased, and when the VDD33 is greater than the first under-voltage protection voltage, a level of the output end of the first comparator is 1.

8. The voltage control circuit as claimed in claim 7, wherein after the level of the output end of the first comparator reaches 1, the AVDD starts to be increased; and when the AVDD is equal to the second under-voltage protection voltage, the level of the output end of the first comparator is 1, a level of the output end of the second comparator is 0, a level of the output end of the AND gate comparator is 0, and the second voltage signal stops being outputted.

9. The voltage control circuit as claimed in claim 8, wherein the AVDD continues to be increased; and when the AVDD is greater than the second under-voltage protection voltage, the level of the output end of the second comparator is 1, the level of the output end of the AND gate comparator is 1, and the second voltage signal is outputted.

10. The voltage control circuit as claimed in claim 9, wherein when a condition that the AVDD is greater than the second under-voltage protection voltage is satisfied, the third voltage signal also starts being outputted, so that the second voltage signal and the third voltage signal start being outputted in a same timing.

11. The voltage control circuit as claimed in claim 10, wherein when the AVDD is greater than the second under-voltage protection voltage, both the second voltage signal and the third voltage signal are continuously outputted.

12. The voltage control circuit as claimed in claim 5, wherein the digital-to-analog conversion module further comprises a digital-to-analog conversion interface and a voltage control interface, the digital-to-analog conversion interface is configured to convert the code signal into a transition signal, and the voltage control interface is configured to convert the transition signal into the first voltage signal and output the first voltage signal.

13. The voltage control circuit as claimed in claim 12, wherein the amplification module further comprises a third comparator, when a level of an output end of the third comparator is 1, the second voltage signal is outputted, and when the level of the output end of the third comparator is 0, the second voltage signal stops being outputted.

14. The voltage control circuit as claimed in claim 13, wherein the I2C control module comprises an I2C communication interface, the first input signal and the second input signal are respectively applied to two input ends of the I2C communication interface, and an output end of the I2C communication interface is connected to an input end of the digital-to-analog conversion interface.

15. The voltage control circuit as claimed in claim 14, wherein the first input signal is SCL, and the second input signal is SDA.

16. The voltage control circuit as claimed in claim 15, wherein the I2C control module further comprises a first capacitor, and the first capacitor is connected to the positive electrode of the input ends of the first comparator; and the digital-to-analog conversion module further comprises a second capacitor, the second capacitor is connected to the positive electrode of the input ends of the second comparator, and the first capacitor is configured to stabilize the VDD33, and the second capacitor is configured to stabilize the AVDD.

17. The voltage control circuit as claimed in claim 6, wherein the AVDD continues to be decreased, the AVDD is less than or equal to the second under-voltage protection voltage, a level of the output end of the AND gate comparator is 0, and the second voltage signal stops being outputted.

18. The voltage control circuit as claimed in claim 17, wherein when the AVDD is equal to the second under-voltage protection voltage, a level of the output end of the second comparator is 0.

19. The voltage control circuit as claimed in claim 18, wherein when the AVDD is equal to the second under-voltage protection voltage, the third voltage signal stops being outputted, and the second voltage signal and the third voltage signal stop being outputted in a same timing.

20. A display panel, comprising the voltage control circuit as claimed in claim 1.

* * * * *